Nov. 28, 1967  E. B. CANFIELD  3,354,725
ACCELEROMETER
Filed Aug. 20, 1963  4 Sheets-Sheet 1
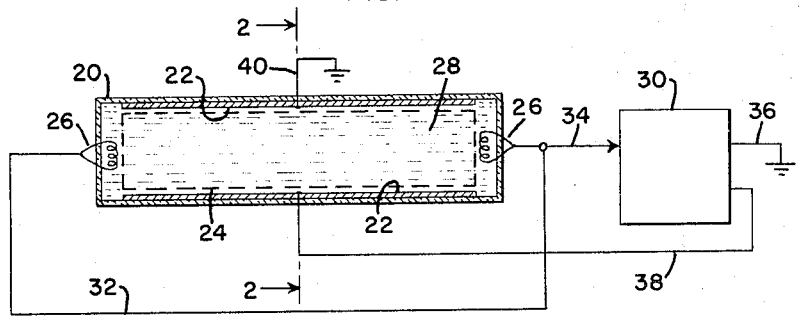
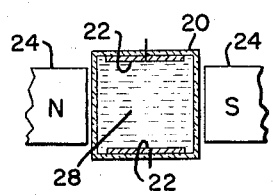
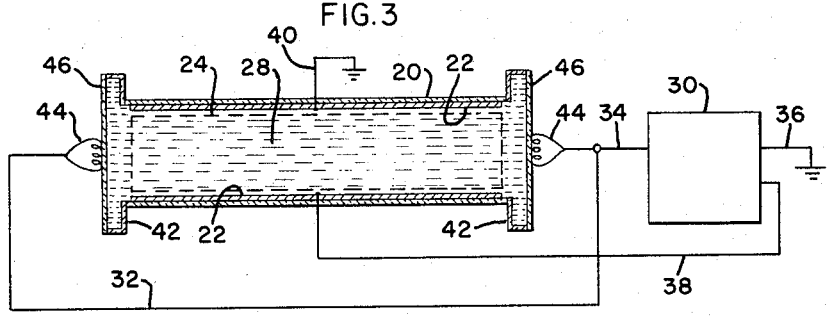
INVENTOR:
EUGENE B. CANFIELD,
BY  T E Kristofferson
HIS ATTORNEY.

Nov. 28, 1967  E. B. CANFIELD  3,354,725

ACCELEROMETER

Filed Aug. 20, 1963  4 Sheets-Sheet 2

INVENTOR:
EUGENE B. CANFIELD,

BY  T E Kristofferson

HIS ATTORNEY.

Nov. 28, 1967   E. B. CANFIELD   3,354,725
ACCELEROMETER
Filed Aug. 20, 1963   4 Sheets-Sheet 3
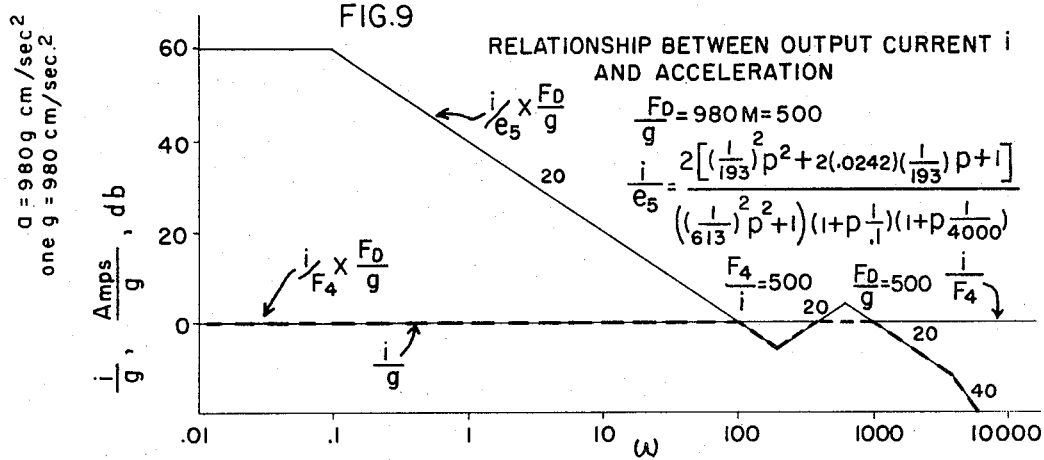
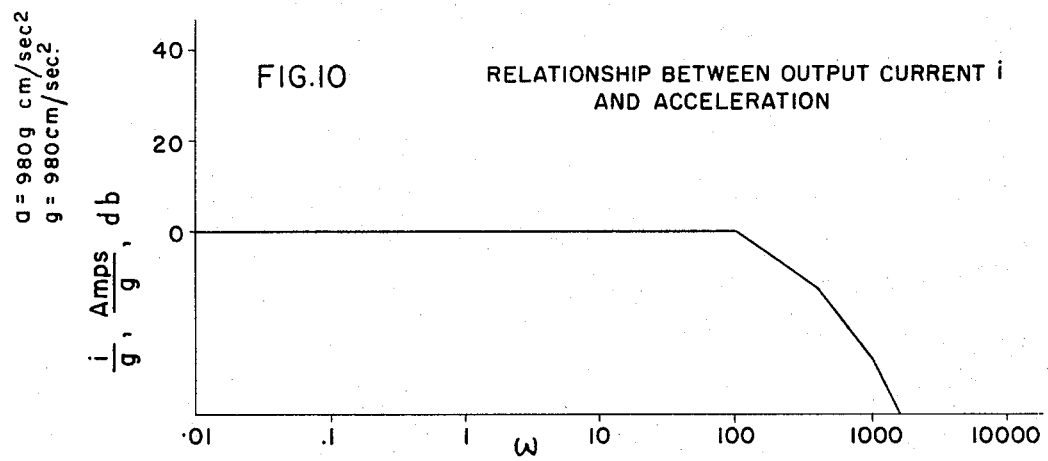
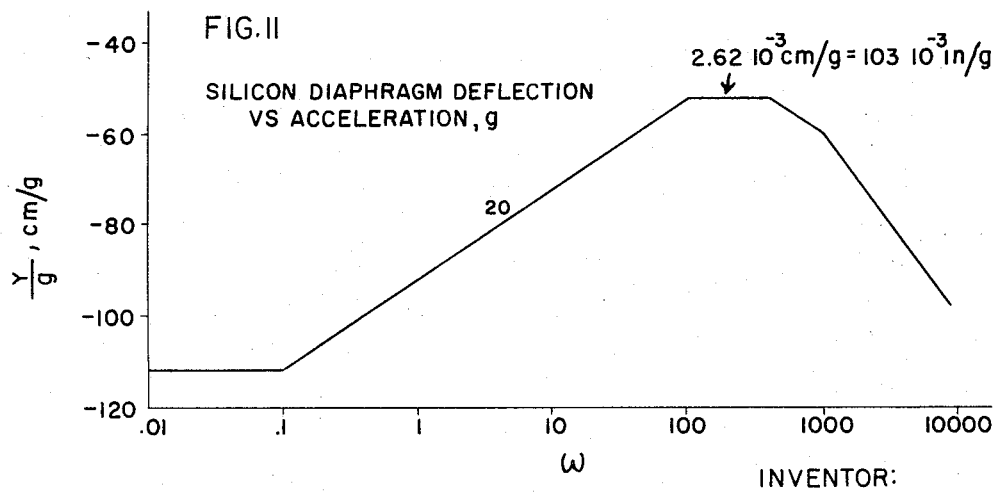
INVENTOR:
EUGENE B. CANFIELD,
BY T E Kustlefferson
HIS ATTORNEY.

Nov. 28, 1967  E. B. CANFIELD  3,354,725
ACCELEROMETER
Filed Aug. 20, 1963  4 Sheets-Sheet 4
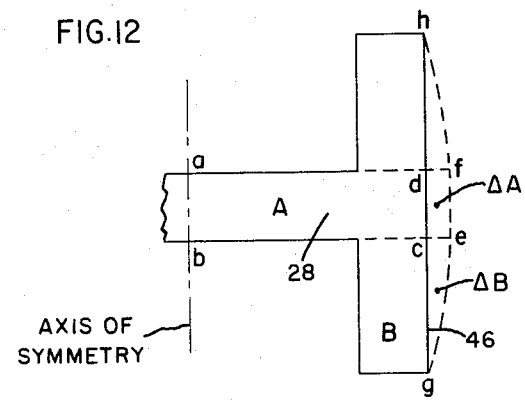
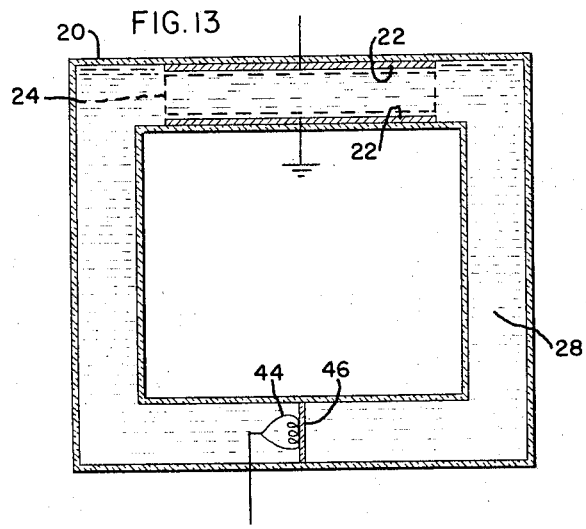
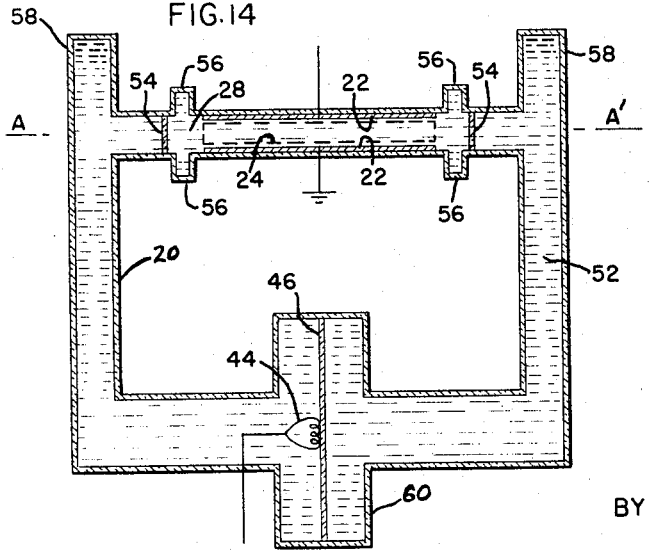
INVENTOR:
EUGENE B. CANFIELD,
BY  T E Kristofferson
HIS ATTORNEY.

United States Patent Office 3,354,725
Patented Nov. 28, 1967

3,354,725
ACCELEROMETER
Eugene B. Canfield, Pittsfield, Mass., assignor to General Electric Company, a corporation of New York
Filed Aug. 20, 1963, Ser. No. 303,246
3 Claims. (Cl. 73—516)

This invention relates to acceleration sensing devices and more particularly to an improved accelerometer employing a force motor principle.

In inertial guidance and other related systems, highly accurate knowledge of linear acceleration is required. Presently, two types of accelerometers predominate; a pendulous integrating gyro accelerometer and a floated pendulum accelerometer. The first of these is highly accurate but has the mechanical complexity of a single axis gimbal system. As a consequence it is large and relatively unreliable and has many moving or rotating parts. Systems being currently developed face requirements of smaller size and higher reliability. This has led to use of the floated pendulum. Although the continuously rotating parts, the gyro wheel and sensitive axis gimbal with motor, have been eliminated, the pendulum is still quite complex containing a signal generator, torque generator, pivot bearings, a magnetic suspension to reduce friction in the pivot support in some cases, a fluid for damping and flotation and a pendulous float. In building the float, it is desirable to align the center of buoyancy with the center of rotation so that the effective pendulocity will not be a function of temperature or fluid specific gravity.

Accordingly, it is an object of this invention to provide a smaller and more reliable accelerometer, less complex than the prior art.

Another object of this invention is to eliminate the float, pivot bearings, need for magnetic suspension, and the AC torque and signal generator and reaction torque error caused thereby.

Still another object of this invention is to eliminate cross coupling errors of the type exhibited in pendulous systems.

A further object is to provide an accelerometer having no moving parts. A still further object of the invention is to provide an accelerometer which with proper temperature compensation is relatively insensitive to temperature changes.

In carrying out the invention in one form thereof, a hollow body or tube is provided of nonconducting material and is filled with a conducting fluid which serves as the mass of the accelerometer. A pair of electrodes are placed on diametrically opposed sides of the tube penetrating the inside wall. A pair of magnetic poles are placed on diametrically opposed sides of the tube orthogonally disposed to the electrodes. Both are provided to form the electrodes and the magnetic field for an electro-hydrodynamic force motor. When DC current is passed through the electrodes, a force is exerted on the fluid to pump it in one direction or the other as a function of the direction of the current flow. A pressure transducer or pickoff is located at either end of the tube in a line approximately orthogonal to the plane of the lines between the electrodes and between the magnetic poles. The transducers are electrically connected to produce an error signal proportional to differential pressure which is sent through an amplifier to the motor electrodes. Acceleration along the transducer or sensitive axis thus creates unequal pressure on the transducers with resulting error signal causing current which is directly proportional to linear acceleration to flow in the force motor. With the constants of the system properly adjusted, this current will minimize the motion of the fluid.

Other forms of the invention may include modifications such as, by way of example, a toroidal shape may be used to sense angular acceleration or a multi-axis accelerometer constructed having pressure pickoffs and electrodes on more than one axis and sensitivity in more than one direction.

Because the fluid will change volume as a function of temperature, some type of compensation such as bellows is required. A standpipe or other compensating chamber to the side of the tube would permit the mass to change as a function of temperature. A bellows may be placed at each end of the tube or preferably the pressure transducers themselves may act as the bellows.

Another modification may include two fluids, the conducting fluid contained along the sensitive axis and a second fluid of different density connecting the ends of the electrolyte to opposite faces of a single transducer.

The above examples are given by way of example only and the novel features which are believed to be characteristic of the invention are set forth with particularity in the appended claims. The invention itself, however, together with further objects and advantages thereof can best be understood by reference to the following description taken in connection with the accompanying drawings in which FIG. 1 is a schematic diagram of a generalized embodiment of the invention;

FIG. 2 is a cross section of FIG. 1 taken along line 2—2;

FIG. 3 is a schematic diagram of a modified embodiment;

FIG. 9 is a plot of the ratio of output current to acceleration versus frequency for a given set of parameters in the block diagram of FIG. 4;

FIG. 10 is a similar plot to FIG. 9 with electrical damping current excluded from the output;

FIG. 11 is a plot of the ratio of silicon diaphragm deflection to acceleration versus frequency;

FIG. 12 is a cutaway view of half of a symmetrical accelerometer tube illustrating the change in fluid volume with temperature;

FIG. 13 is a cross sectioned schematic diagram of a configuration of the accelerometer for measuring angular acceleration; and, FIG. 14 illustrates a configuration of the accelerometer using two fluids of different density for measuring linear acceleration.

Figure 4:
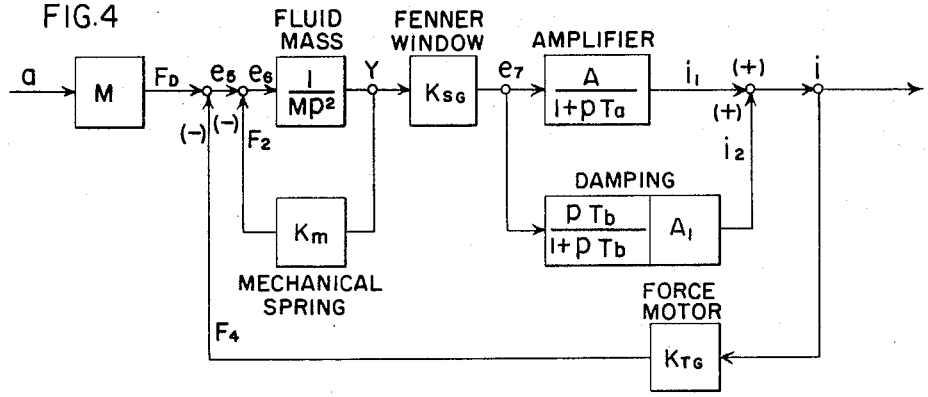
FIGS. 4 and 5 are block diagrams illustrating transfer functions, currents, acceleration and forces present in an embodiment such as shown in FIG. 3.

Turning now to FIG. 1 a hollow nonconducting tube 20 is illustrated having force motor electrodes 22 disposed on diametrically opposed sides.

Orthogonal thereto and also diametrically opposed are the magnetic pole faces 24 one of which is illustrated. Transducers 26 are mounted in either end of tube 20 which is filled using conducting fluid 28. An amplifier 30 is provided. Transducers 26 are connected together in series by lead 32 and their differential output connected to amplifier 30 over lead 34 referenced to ground by way of lead 36. The output of amplifier 30 is connected over lead 38 to one of the motor electrodes 22 the other of which is connected to ground over lead 40. The other side of the output of amplifier 30 is again connected to ground over lead 36.

The fluid 28 is used as the inertial mass of the accelerometer. The flux passing between the magnetic pole faces 24 forms the magnetic field for an electro-hydrodynamic force motor such that when D.C. current is passed between the electrodes 22, a force is exerted on fluid 28 to pump it in one direction or the other along the line between transducers 26 depending on the direction of current flow. Connecting the transducers 26 in the manner illustrated produces an error signal proportional to differential pressure. This signal is provided over lead 34 to amplifier 30 where it is amplified and applied to motor electrodes 22 over lead 38. If tube 20 is now accelerated along its sensitive axis, that is, the line between transducers 26, unequal pressure on the transducers 26 will create an error signal causing the current to flow between electrodes 22 in the force motor. This current is directly proportional to linear acceleration if the transducers 26 and amplifier 30 are operating in their linear range and adjusted as hereinafter disclosed and the current creates a force motor action tending to restrict the motion of fluid 28 keeping the output of transducers 26 linear.

A preferred rectangular cross section for the tube 20 is illustrated in FIG. 2 which is an end view of the tube illustrated in FIG. 1. Again electrodes 22 are disposed on opposite sides and the magnets 24 are disposed also on opposite sides at right angles to the electrodes 22. Tube 20 is filled with the fluid 28.

A more specific embodiment of the accelerometer is illustrated in FIG. 3 which is drawn somewhat out of proportion to better illustrate the components. Again, with similar numerals for components which correspond to those in FIG. 1, tube 20, which may be made of silicon, has a pair of motor electrodes 22, which may be of platinum, disposed on opposite sides and magnetic pole faces 24 also disposed on opposite sides at right angles to electrodes 22. Also, again tube 20 is filled with fluid 28. This may be Hg, Ga or NaK for example. A device using NaK may have a shorter life or be more difficult to build because of the high activity of NaK. The dissimilarity in resistance between the Pt of electrodes 22 and a Ga fluid 28 should aid in the current distribution in tube 20 making it more uniform in nature.

In this embodiment end pieces 42 have a larger diameter than tube 20 and contain transducers 44 comprising a Fenner window such as is described in a patent application, Ser. No. 104,271 filed Apr. 20, 1961 in the name of Gunther E. Fenner which is assigned to the assignee of the present invention. Further information on these devices is obtainable from the Semiconductor Products Dept. of the General Electric Co., Electronics Park, Bldg. 7, Syracuse, N.Y. in the form of Application Note 90.55 dated 5/63 by A. Zias and C. Purser. Typical devices are covered by Semiconductor Specifications 55.23, 55.24 and 55.25 of the above mentioned Dept. issued April 1963 and covering devices 4JN307, 308, 309, 310, 311, 401 and 402. The Fenner window 44 is grown on a silicon diaphragm 46 which constitutes the entire outer end of end piece 42. These diaphragms 46 are electron beam welded to the rest of end piece 42 which in turn may be electron beam welded to the ends of tube 20. In addition to the use of silicon-to-silicon seals to attach end cap 42 to tube 20, seals to aluminum, Kovar and molybdenum, for example, may be used. Temperature control is required to yield an instrument of high accuracy. It may be provided by any well-known means of controlling the external temperature. In some applications with gyros where there is already a provision for holding the gyro within 1° Fahrenheit this mechanism should also serve to provide stabilization for the accelerometer. Again the transducers 44 are connected in series over lead 32 although a parallel connection may also be used and over lead 34 to an amplifier 30 the output of which is connected over lead 38 across motor electrodes 22 and lead 40 to ground. The other side of the input and output of amplifier 30 is again grounded over lead 36.

The resulting current between electrodes 22 and in lead 38 is directly proportional to linear acceleration and may be read by a number of means. This might be done simply by measuring the voltage across a resistor in lead 38. Pulse forcing means using pulses of high frequency having a polarity dependent on the direction and using small pulse areas for high accuracy may also be used. Nuclear magnetic resonance is a new and suggested method in addition to the more conventional and presently used methods and is more fully described in an article entitled "Two Nuclear Magnetic Resonance Devices Which Automatically Follow Time Varying Magnetic Fields-Possible Applications" by Abrahamson, Heinen, Larson and Senstad published in the Proceedings of National Electronics Conference, vol. XVII, Oct. 9–11, 1961, pp. 250–257.

In arriving at design characteristics for a device such as disclosed in FIG. 3, the following equations may be employed:

A pressure transducer which will develop the required signal as a function of deflection and which has a spring constant of zero will have the following relationship between current and acceleration under steady state conditions.

$$\frac{i}{a} = \frac{M}{K_{TG}} \quad (1)$$

where
$i$ = output current
$a$ = acceleration
$M$ = mass of fluid
$K_{TG}$ = force generator force constant This is analogous to the situation in pendulous accelerometers where it is necessary to hold only the mass unbalance and the torque generator gain constant. In the subject invention it is necessary to hold the inertial mass and the force generator gain constant. The flux density of the force motor may be held constant for example by nuclear magnetic resonance means. A permanent magnet may also be employed but even this may require some correction for a desired range of accuracy over a specified time period.

Many available pressure pickoffs such as piezoresistive transducers not only produce a signal proportional to their deflection but also require a force to produce deflection resulting in a spring constant. If they also have hysteresis, this would subject the accelerometer to potentially serious errors since hysteresis would require current to flow to return the pressure transducer deflection to zero. The Fenner window 44 disclosed above, grown directly on a silicon wafer substrate, has no hysteresis. It is a piezoresistive bridge having a measured accuracy better than 10 parts per million confirming lack of hysteresis. Because the pressure transducer has a mechanical spring constant, the relationship between current and acceleration is $$\frac{i}{a} = \frac{M}{K_{TG}\left(1 + \frac{K_m}{K_e}\right)} \quad (2)$$

where $K_m$ = mechanical spring constant of the pressure transducer.
$K_e$ = electrical spring constant = $K_{SG}AK_{TG}$ = the gain product of the pressure transducer, amplifier and force generator.

Thus, in addition to holding $M$ and $K_{TG}$ constant, it is necessary to hold $(1+K_m/K_e)$ constant. Fortunately, this is possible and practical. The mechanical spring constant for the silicon wafer substrate 46 is linear and fixed. Prime consideration must be given to the electronic amplifier 30. If the ratio of the electrical spring constant $K_e$ is made one thousand times larger than the mechanical spring constant $K_m$ then a 1% variation in $K_e$ causes only a 10 p.p.m. change in $(1+K_m/K_e)$. It is practical to have $K_e = 1000K_m$ and transistor current amplifier gain may be held not only to 1% but to 0.1% if desired.

Since lag filter time constants as long as 10 to 20 seconds are desirable and may be placed in the electronic amplifier 30 without unduly impairing the accelerometer frequency response, signal-to-noise ratio problems are minimized. Bandwidths are as good or better than available for other types of accelerometers.

Figure 5:
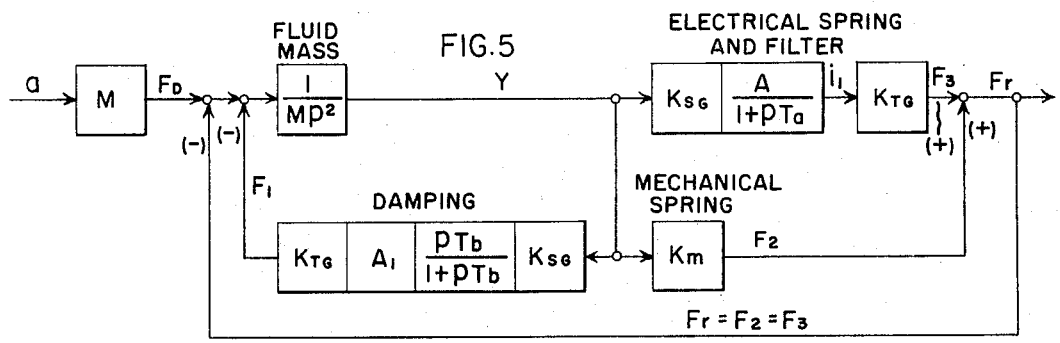

The accelerometer block diagrams illustrated in FIGURES 4 and 5 have the following nomenclature:

$a$=acceleration input.
$M$=fluid mass.
$E_D$=force due to linear acceleration.
$Y$=deflection of Fenner window silicon diaphragm.
$K_{SG}$=Fenner window gain.
$A$=electric spring amplifier gain.
$T_a$=electric spring amplifier time constant.
$K_{TG}$=fluid force motor gain.
$K_m$=mechanical spring constant (silicon diaphragm).
$A_1$=damping amplifier gain.
$T_b$=damping differentiating time constant.
$K_e=K_{SG}AK_{TG}$=electrical spring constant.
$B_d$=electrical damping=$K_{SG}AK_{TG}T_b$ if $M/B_d \gg T_b$.
$p$=differential operator, also well known as heavy side operator.
$i_1$=current from electric spring amplifier.
$i_2$=damping current.
$i=i_1+i_2$=total force motor current.
$F_1$=force from damping.
$F_2$=force from mechanical spring.
$F_3$=force from electrical spring and filter.
$F_1=F_2+F_3$.

From the block diagram of FIG. 4, the relationship between the total output current, $i$, and acceleration, $a$, may be found as follows:

$$\frac{Y}{e_5} = \frac{1}{K_m\left(\frac{M}{K_m}p^2+1\right)} \quad (3)$$

$$\frac{i}{e_7} = \frac{A\left[p^2\frac{A_1T_aT_b}{A}+pT_b\left(1+\frac{A_1}{A}\right)+1\right]}{(1+pT_a)(1+pT_b)} \quad (4)$$

$$\frac{i}{a} = \frac{M\left[p^2\frac{A_1}{A}(T_aT_b)+pT_b\left(1+\frac{A_1}{A}\right)+1\right]}{K_{TG}\left(1+\frac{K_m}{K_e}\right)\left[p^4\frac{MT_aT_b}{K_m+K_e}+p^3\frac{M(T_a+T_b)}{K_m+K_e}+\right.}$$
$$p^2\frac{M+K_mT_aT_b+\left(\frac{A_1}{A}\right)T_aT_bK_e}{K_m+K_e}+$$
$$\left.p\frac{K_m(T_a+T_b)+T_bK_e\left(1+\frac{A_1}{A}\right)}{K_m+K_e}+1\right] \quad (5)$$

The block diagram of FIG. 5 may be used to more easily understand the effect of the time constant, $T_a$, in the electric spring amplifier. If the electric spring $K_e=K_{SG}AK_{TG}$, the effect of the time constant $T_a$ is to change the total effective spring constant as a function of frequency. In the low frequency region below $w=1/T_a$, the total spring constant is $K_e+K_m$. Above $w=1/T_a$ the total effective spring constant begins to decay until it reaches a value of $K_m$ in the high frequency region. The capability of adding the lag filter to the electric spring amplifier does much to make a practical system by providing filtering on the electrical signal while not impairing the bandwidth. The bandwidth may be governed by the mechanical spring constant if desired.

Figure 6:
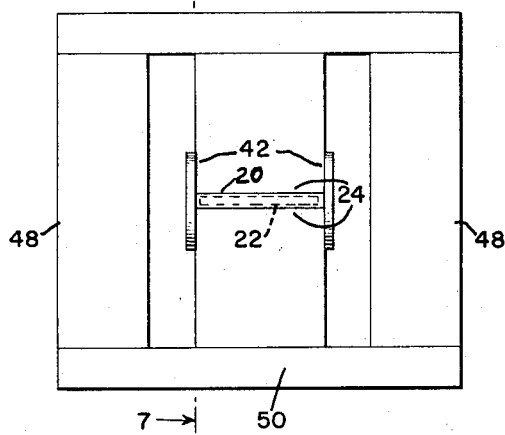
FIG. 6 is a section of an accelerometer tube and associated magnet structure illustrating a preferred embodiment.

FIG. 6 shows a side view more in proportion of a chamber for an accelerometer body comprising the tube 20 and end pieces 42 such as illustrated in FIG. 3 having two permanent magnet sections 48 and a soft iron section 50 to form the magnetic pole faces 24 on opposite sides of tube 20.

Figure 7:
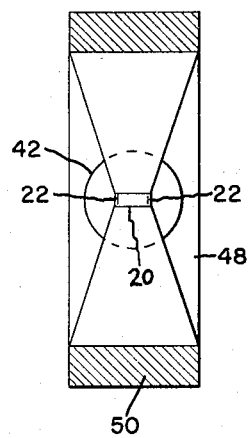
FIG. 7 is a cross section of FIG. 6 taken along line 7—7.

FIG. 7 shows a section view of FIG. 6 taken at line A—A showing the rectangular cross section of tube 20 and circular cross section of end piece 42.

Figure 8:
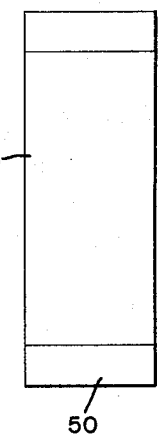
FIG. 8 is an end view of FIG. 6.

FIG. 8 is an end view of FIG. 6 showing the permanent magnet 48 and soft iron section 50.

The following parameters are intended to be illustrative of one embodiment which the accelerometer might take keeping in mind that if gallium is used it has to be kept warm as it solidifies near room temperature and also exhibits a relatively unique feature in that it expands when it solidifies.

Type of fluid—gallium.
$M$=fluid mass=.51 gm.
$K_{TG}$=force motor gain=500 dynes/amp.
$K_m$=mechanical spring constant=1.915 $10^5$ dynes/cm.
$K_e$=electrical spring constant=1.915 $10^8$ dynes/cm.
$K_{SG}$=Fenner window gain=300 volts/cm.
$A$=amplifier gain=1275 amps/volt.
$A_1$=damping amp gain=13.6 amps/volt.
$T_a$=amplifier time constant=10 sec.
$T_b$=damping differentiating time constant=1/4000 sec.
Length between fluid motor electrodes, $L$=.5 cm.
Active length of fluid motor, l=1.725 cm.
Thickness of fluid between magnet poles, $h$=.1 cm.=.04 in.
Case wall thickness under poles=.025 cm.=.01 in.
Total gap between magnet poles=.15 cm.=.06 in.
Air gap flux density=10 kilogauss.
Magnet material—Alnico V.
    Flux density of magnet, $B_m$=10.5 kilogauss.
    Field strength of magnet, $H_m$=.52 $10^3$ oersted.
    Length=3.9 cm.
    Area=4.11 cm.
    Weight=4.6 oz.
Silicon diaphragm diameter=1.27 cm.=.5 in.
    Thickness=.00186 in.
    Area=1.265 cm.$^2$.
    Area of fluid motor cross section=.05 cm.$^2$.
    Resultant pressure amplification factor=25.3.
    Spring constant by itself=48.5 $10^5$ dynes/cm.
    Spring constant referred to fluid motor=1.915 $10^5$ dynes/cm.
    Deflection to break=.0047 in.
    Assumed breaking stress=9000 p.s.i.
    Stops set at .003 to .004 in.
    Deflection per g (amp turned off)=1.03 $10^{-3}$ in./g.
Resistance of force motor—155 $10^{-6}$ ohms.
Power into motor at 20 g.=.062 watts.
Eddy current self damping (not considered in gain of damping amplifier)=162 dynes/cm./sec.
Electrical damping=510 dynes/cm./sec.
Characteristic line constant, $M/B_d$=.001 sec.
Fluid volume change=113 p.p.m./° C.
Output gradient=1 amp/g.
Maximum acceleration range=20 g.

Using the above parameters in the block diagram (FIG. 4) yields the relationship $i/a$ of FIG. 9. If the electrical damping current $i_2$ were excluded from the output, the relationship $i_1/a$ of FIG. 10 would then show the bandwidth. However, there is no reason for complicating the system by separating the damping and electrical spring currents. Design bandwidth for the accelerometer is 100 rad./sec. and is available from either $i/a$ or $i_1/a$. In the fluid accelerometer, silicon diaphragm deflection is analogous to rotation of a PIG gyro about its output axis or rotation of a pendulum about its pivot axis. The relationship $Y/g$ is shown in FIG. 11.

For gallium, the volume temperature coefficient is 113 p.p.m./° C. The coefficient is even higher for mercury. Temperature control and compensation is required to provide for change in fluid volume, and to maintain constant fluid mass. The second condition can be explained further referring to FIG. 12. If the device had the same cross section everywhere, the effective fluid mass could not change even though it experienced a change in volume. However, since the device is H-shaped, a change in temperature may cause a change in the effective fluid mass. In FIG. 12 which represents half the accelerometer (since the accelerometer body is symmetrical about its center), the solid line *gcdh* represents the silicon diaphragm 46 in its normal position. An increase in temperature will cause the diaphragm 46 to become bowed along the dotted line *gefh*. The volume of fluid 28 being accelerated by the fluid motor at normal temperature can be treated as is enclosed by area $A=abcd$. At normal temperature the fluid volume in area A is V. At increased temperature the fluid volume V increased by $\Delta V$. At the increased temperature, if $V+\Delta V=A+\Delta A$, then the total mass being accelerated by the fluid motor remains constant as desired. Of course, this also means that the fluid volume in B must be contained by $B+\Delta B$ as the temperature is increased. Depending upon the design parameters, it is possible that the fluid mass may increase, decrease, or remain constant as temperature is increased. It also appears that if proper consideration is given to the various design parameters, the fluid mass may be held constant for reasonable changes in temperature. However, temperature control is desirable.

Acceleration at right angles to the sensitive axis places equal pressure on each diaphragm 46. Therefore, the device inherently is not sensitive to cross axis acceleration. However, the relative location of the Fenner Windows 44 on the silicon diaphragms 46 at either end will affect the cross axis sensitivity and it is important that the Fenner Windows 44 be placed as mirror images. If further structural strength is required to protect diaphragms 46, it would be possible to mechanically interconnect them for instance by a fine wire between the centers of the diaphragms.

FIG. 13 illustrates a configuration of the fluid accelerometer of the invention adapted to measure angular acceleration. In this embodiment the tube 20 forms a closed circuitous path, in this case rectangular in shape. Again motor electrodes 22 and magnet pole faces 24 are placed at right angles to each other along a portion of the path defined by tube 20 to form the force motor previously referred to. In this case a single silicon diaphragm 46, with a transducer 44 mounted thereon, is placed in tube 20 as shown. Tube 20 is filled with fluid 28 the flow of which is interrupted by diaphragm 46. Because tube 20 forms a closed circuitous path the mass of fluid 28 is sensitive to angular acceleration in the plane of the drawing. The resulting motion is sensed by transducer 44 and can be converted into a signal and amplified and transmitted to motor electrodes 22 in the manner previously described to restrict motion of fluid 28 whereupon the amplified signal from transducer 44 is proportional to angular acceleration.

A further embodiment of the invention employing two fluids of different density is illustrated in FIG. 14. Again tube 20 forms a closed rectangular path. A first fluid 52 of one density is in the lower portion of tube 20 and a second fluid 28, which is again conducting and has a different density from fluid 52, is in the upper portion between spacers 54. Motor electrodes 22 and magnet poles 24 are again placed at right angles around the portion of the tube 20 containing the conductive fluid 28. Extensions 56 and 58 are used to make the pressure distribution across diaphragms 54 more uniform. It will be understood that the lengths of extensions 56 and 58 will depend upon the densities of the two fluids 28 and 52. If fluid 28 is the more dense then extensions 56 will be shorter than 58 in accordance with the ratio of the densities. Also the distance from the top of extension 58 to the axis A–A' should be equal to the distance from the axis A–A' to the bottom of the enlarged portion 60 of tube 20 containing diaphragm 46 and transducer 44. The embodiment as illustrated in FIG. 14 is intended for measurement of linear acceleration along the axis A–A'. Due to the difference in the densities of fluids 28 and 52 if the acceleration is to the left along axis A–A' then the more dense fluid, i.e. 28, will move toward the right creating a resulting pressure on the right side of diaphragm 46. The transducer 44 may again be connected through an amplifier to motor electrodes 22 to provide a force motor action such as previously described.

A further embodiment might remove the diaphragms 54 and fill the entire upper portion of tube 20 with a conducting fluid 28 which may have a lower density than fluid 52. The accelerometer could then be spun around axis A–A' to keep the two fluids separated. The remaining operation would again be as previously described.

While particular embodiments of the invention have been described, it will be understood that it is not intended to limit the invention thereto, since many modifications may be made, and it is therefore contemplated by the appended claims to cover any such modifications as fall within the true spirit and scope of the invention.

What is claimed as new and desired to be secured by Letters Patent of the United States is:

1. An accelerometer comprising a hollow nonconducting tube having a substantially rectangular cross section and being substantially straight along a sensitive axis; said tube having enlarged end portions for mounting a silicon diaphragm on the extreme ends of said tube; a Fenner Window mounted on each of said diaphragms in mirror image relationship; a pair of motor electrodes mounted over substantially the entire internal area of two opposite sides of said tube; a pair of magnet pole faces of opposite polarity positioned adjacent to and covering substantially the entire area of the remaining two sides of said tube; a conducting fluid substantially filling said tube; an amplifier; means connecting the output of said Fenner Windows to the input of said amplifier; means connecting the output of said amplifier across said electrodes; said diaphragms having a defined spring constant; said Fenner windows, amplifier, motor electrodes, pole faces and conducting fluid forming a force generating means; said force generating means having an equivalent spring constant; and the ratio of said defined spring constant to said equivalent spring constant being low enough such that the output of said amplifier stays within its linear range over a range of acceleration it is desired to measure whereby when said accelerometer is subjected to acceleration along said sensitive axis the output of said amplifier is a measure of the acceleration and serves to restrict the motion of said fluid relative to said tube resulting from the acceleration.

2. An accelerometer comprising a hollow nonconducting tube having a substantially rectangular cross section and being substantially straight along a sensitive axis, said tube having enlarged end portions for mounting a silicon diaphragm on the extreme ends of said tube, a Fenner Window mounted on each of said diaphragms in mirror image relationship, a pair of motor electrodes mounted over substantially the entire internal area of two opposite sides of said tube, a pair of magnet pole faces of opposite polarity positioned adjacent to and covering substantially the entire area of the remaining two sides of said tube, a conducting fluid substantially filling said tube, an amplifier, means connecting the outputs of said Fenner Windows to the input of said amplifier, means connecting the output of said amplifier across said electrodes, said amplifier being adjusted to restrict the motion of said fluid such that the output of said Fenner Windows and said amplifier remain in their linear range when said windows are displaced by an acceleration along said sensitive axis.

3. An accelerometer comprising a hollow nonconducting tube having a substantially rectangular cross section and being substantially straight along a sensitive axis, said tube having enlarged end portions for mounting a silicon diaphragm on the extreme ends of said tube, a Fenner Window having a defined spring constant mounted on each of said diaphragms in mirror image relationship, a pair of motor electrodes mounted over substantially the entire internal area of two opposite sides of said tube, a pair of magnet pole faces of opposite polarity positioned adjacent to and covering substantially the entire area of the remaining two sides of said tube, and amplifier circuit means for passing the output signal from said Fenner Window to said electrodes, the ratio of said spring constant of said Fenner Windows to that of the equivalent spring constant of said electrodes amplifier circuit means and magnet being low enough such that the output of said Fenner Windows remains in linear range when displaced along said axis by an angular acceleration, and a conducting fluid substantially filling said tube.

References Cited

UNITED STATES PATENTS

| | | | |
|---|---|---|---|
| 2,650,991 | 9/1952 | Ketchledge | 73—516 |
| 2,921,471 | 1/1960 | Weber | 73—398 |
| 2,943,493 | 7/1960 | Bosch | 73—516 |
| 2,975,641 | 3/1961 | Lees | 73—516 |
| 2,988,920 | 6/1961 | Lees | 73—516 |
| 3,008,334 | 11/1961 | Lees | 73—516 |
| 3,121,336 | 2/1964 | Riordan | 73—516 |
| 3,164,997 | 1/1965 | Aske | 73—503 |
| 3,176,520 | 4/1965 | Aske | 73—516 |

FOREIGN PATENTS 894,778 10/1953 Germany.

JAMES J. GILL, *Primary Examiner.*